United States Patent [19]
Yoo

[11] Patent Number: 5,803,864
[45] Date of Patent: Sep. 8, 1998

[54] CONTROL SYSTEM FOR REDUCING THE STOPPING DISTANCE IN AN ABRUPT OPERATION AND A METHOD THEREOF

[75] Inventor: Jin-ho Yoo, Kyungki-do, Rep. of Korea

[73] Assignee: Hyundai Motor Company, Rep. of Korea

[21] Appl. No.: 624,355

[22] Filed: Apr. 11, 1996

[30] Foreign Application Priority Data

Apr. 12, 1995 [KR] Rep. of Korea ......................... 95-8493

[51] Int. Cl.[6] .................................................. F16H 61/00
[52] U.S. Cl. ........................ 477/119; 477/144; 477/154
[58] Field of Search .................................... 477/118, 119, 477/140, 141, 144, 148, 154

[56] References Cited

U.S. PATENT DOCUMENTS

| | | | |
|---|---|---|---|
| 5,016,496 | 5/1991 | Takizawa | 477/119 X |
| 5,054,336 | 10/1991 | Takizawa | 477/118 X |
| 5,105,923 | 4/1992 | Iizuka | 477/119 X |
| 5,201,251 | 4/1993 | Kitagawa et al. | 477/120 X |
| 5,203,235 | 4/1993 | Iizuka | 477/118 X |
| 5,577,979 | 11/1996 | Iizuka | 477/109 |

FOREIGN PATENT DOCUMENTS 2-154858  6/1990  Japan ..................................... 477/119

*Primary Examiner*—Khoi Q. Ta
*Attorney, Agent, or Firm*—Finnegan, Henderson, Farabow, Garrett & Dunner, L.L.P.

[57] ABSTRACT

In the vehicle equipped with an ABS, a control system for reducing stopping distance in an abrupt braking operation and a method thereof includes an idle sensor for detecting an operating state of an accelerator pedal; a brake sensor for detecting an operating state of a brake pedal; a brake operation sensor for detecting an angle change of a brake pedal to output an electric signal corresponding thereto; an engine RPM sensor for detecting a rotation number of a crank gear to output an electric signal corresponding thereto, the sensor being equipped on an engine crank shaft and rotated by driving engine; a transmission control unit which when a power source is applied to the vehicle and the idle switch and the brake switch is worked, detects the angle change per hour of the brake pedal and then if the brake angle change is over the predetermined one, determines that as an abrupt braking state, and further detects the shift range set up by the operation of the shift lever as well as the current shift stage in accordance with the current shift range, and thus down-shifts into a lower stage than the current running shift stage; and an hydraulic pressure control valve for applying an hydraulic pressure to shift gear devices corresponding to shift signals output from the transmission control unit; and thereby when the driver abruptly pedals the brake, performs forceful down-shifting into a lower stage than the current shift stage.

15 Claims, 10 Drawing Sheets

CONTROL SYSTEM FOR REDUCING THE STOPPING DISTANCE IN AN ABRUPT OPERATION AND A METHOD THEREOF

BACKGROUND

This invention relates to a control system for reducing the stopping distance in an abrupt braking operation and a method thereof, and more particularly to the control system and its method applied to a vehicle having an automatic transmission equipped with an anti-lock brake system (ABS).

Generally, anti-lock brake systems have been used to increase safety of the vehicle by preventing slippage between the tires and the road surface and thereby giving steering capability to the vehicle while abrupt braking.

When the driver abruptly applies excessive pressure to the brake, a control unit of the ABS inputs signals output from four wheel speed sensors and detects the speed reduction state of the wheels. Then, the control predicts the degree of slippage between the tires and the road surface, and according to its prediction, selects the optimal speed reduction pattern and feedback-controls in the light of the resulting value.

That is, the ABS gives the steering capability to the vehicle by releasing the brake before completely locking the brake so as not to generate slippage.

However, while the conventional ABS can prevent slippage by precluding the wheels from being locked, the stopping distance of the vehicle is barely reduced and thereby deteriorates vehicle safety.

SUMMARY

Accordingly, the present invention has been made in an effort to solve the above-described problem.

It is an object of the present invention to provide a control system for reducing the stopping distance in an abrupt braking operation and a method thereof that when a vehicle having an automatic transmission is abruptly braked, the transmission is forcefully down-shifted into a lower stage than the current running shift stage to enhance the engine brake effect, and thereby the stopping distance can be reduced.

To achieve the above object, the control system according to a first preferred embodiment of the present invention includes means for detecting an operation state of an accelerator pedal to output an electric signal corresponding thereto; means for detecting an operation state of a brake pedal to output an electric signal corresponding thereto; means for detecting a brake pedal angle to output an electric signal corresponding thereto; means for detecting a rotating number of a crank gear to output an electric signal corresponding thereto, the means being equipped on a crank shaft of an engine; a first pulse generator which is equipped on a kick-down drum and detects a rotating number of the drum to output a signal corresponding thereto; a second pulse generator which is equipped on an output gear of a transmission and detects a rotating number of the gear to output a signal corresponding thereto; a switch which outputs a signal corresponding to the shift stage established by shifting a shift lever; a transmission control unit which during operation of the brake pedal, detects the pedal's angle change per hour and in case the change is over the predetermined amount, prescribes the state as abrupt braking and further detects the current running shift stage in accordance with the established shift range, and then outputs a shift signal for down-shifting into a lower level than the current one; an hydraulic pressure control valve which acts hydraulic pressure on a corresponding shift gear in accordance with the shift signal outputted from the transmission control unit.

To achieve the above object, the control method of the present invention including the steps of:

initializing all use variables and getting hold of operation states of an idle switch and a brake switch when a power source is applied to a vehicle;

detecting a brake pedal angle per hour changed by handling the brake when the idle switch and the brake switch are operated;

determining the state as an abrupt braking when comparing the brake pedal angle change per hour with the predetermined value, the former is over the latter;

detecting a shift range predetermined by the current shift lever as well as the current running shift stage in accordance with the detected shift range when abruptly braked; and down-shifting into a lower level than the current running shift stage.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DESCRIPTION

A preferred embodiment of the present invention will now be described in detail with reference to the accompanying drawings.

Figure 1:
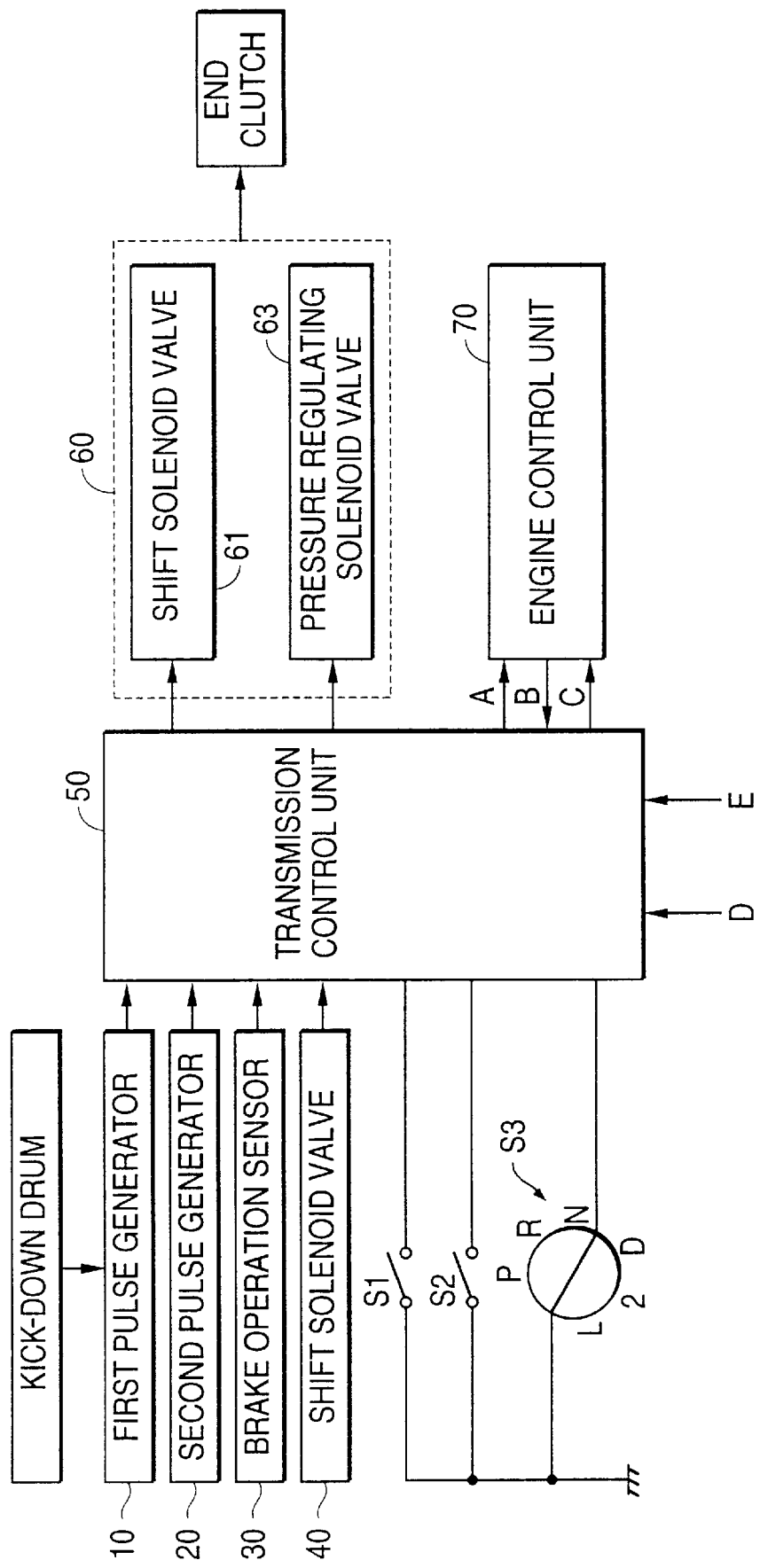
FIG. 1 is a block diagram of the stopping distance reducing control system in an abrupt braking operation according to the present invention.

As described in FIG. 1, a control system for reducing a stopping distance in an abrupt braking operation includes a first pulse generator 10 which is equipped on the input side of a transmission and detects a rotation speed of a kick-down drum; a second pulse generator 20 which is equipped on the output side gear of the transmission and detects the rotation speed of the gear; a brake operation sensor 30 which detects a brake pedal operation; an engine RPM sensor 40; an idle switch S1; a brake switch S2 which cooperates with the brake pedal; an inhibitor switch S3 which detects the position of a change lever; an engine control unit 70; a transmission control unit 50 which is connected with the pulse generators, the sensors and the output ends of the switches and determines the abrupt braking state according to the signals(B, D, E) applied from the engine control unit 70 and an ABS control unit(not shown), and then in abrupt braking, forcefully down-shifts into a lower level than the detected current running shift stage to output a shift signal corresponding thereto; and an hydraulic pressure control valve 60 which feeds hydraulic pressure to the corresponding gear according to the shift signal output from the transmission control unit.

The hydraulic pressure control valve 60 includes a shift solenoid valve 61 and a power control solenoid valve 63.

While the transmission control unit 50 outputs a torque reduction request signal A and a maximal torque reduction request signal C to the engine control unit 70, the engine control unit outputs a reduction admitting signal B corresponding to the signals A, C to the transmission control unit.

The ABS control unit(not shown) outputs wheel speed signals D and E to the speed change control 50.

The operation of the control system for reducing the stopping distance in the abrupt braking operation according to a preferred embodiment of the present invention can be described as shown below.

Generally, when an engine brake is operated in the abrupt brake state, the vehicle's running inertia is in a power-off state higher than the tractive force of the engine.

In the vehicle equipped with the ABS, it is possible to prevent the fixed or locked state of the wheels in a power off state. Thus, the wheels continue rotating even after a brake has been operated.

As described above, since the wheels continue rotating even in the brake operating state, it is possible at that time to reduce the stopping distance by distributing stopping loads only transmitted to the brake, also to the engine.

Figure 2:
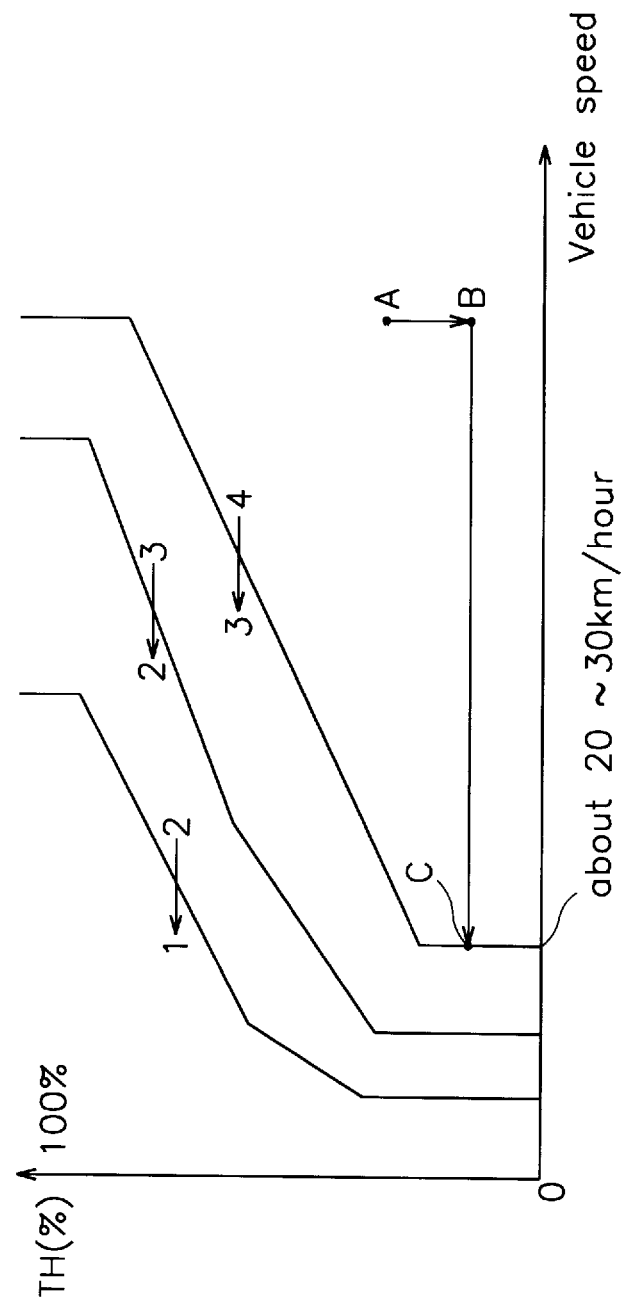
FIG. 2 is a shift-pattern diagram of the automatic transmission according to the present invention.

For example, as described in FIG. 2, an up-shift or a down-shift does not occur even when the driver applies further pressure to the accelerator in a fourth speed.

However, when the throttle valve is in a less opened state and the brake is operated after a predetermined idle time, the running state is, as shown in FIG. 2, moved from the A point into the B point owing to the throttle valve's less opened state and the automatic transmission continues its operation with the fourth speed until the vehicle speed reaches the C point(about 20–30 kph).

Accordingly, since the automatic transmission is not down-shifted until the vehicle speed reaches the C point and engine brake effect operates after the transmission is down-shifted, the stopping distance becomes longer.

Therefore, as described above, when the wheels continue their rotation by the ABS in the abrupt braking operation, the stopping distance reduction is realized by the engine brake effect resulted from the forceful down-shifting lower than the current running shift stage.

For the above realization, the movement routine of the transmission control unit 50 will be described hereinafter.

Figure 5:
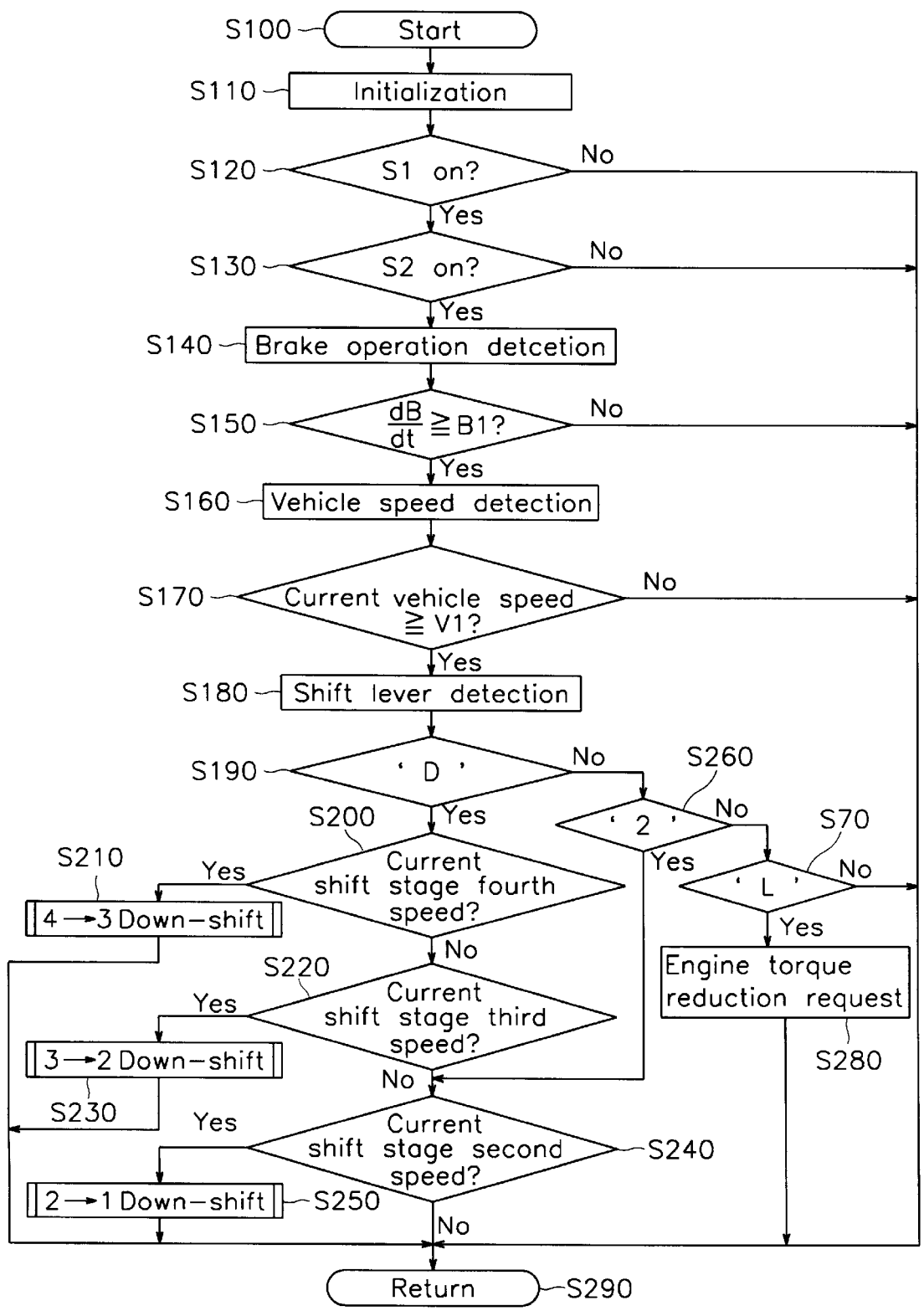
FIG. 5 is a main movement sequential view of the stopping distance reducing control system in the abrupt braking operation according to the present invention.

As shown in FIG. 5, when the power source is applied to the vehicle and all equipment is initialized, the transmission control unit 50 initializes all use variables and examines anything wrong by performing a self diagnostic routine, and then enters into the abrupt brake routine to determine the running condition for performing that routine.

The transmission control unit 50 initializes all use variables in the abrupt brake routine(S100–S110) and then examines the operating state of the idle switch S1(S120).

When the idle switch S1 is in a state of power-on because the driver has not pedalled the accelerator, the transmission control unit examines the operating state of the brake pedal(S130).

When the driver operates the brake and the brake switch S2 cooperating with the brake pedal is operated, the transmission control unit 50 examines the operating state of the brake switch S2, and then if the switch is in a power-on state, detects the brake operation.

The brake operation sensor 30, which includes a BPS (brake position sensor) equipped on the brake pedal, detects a brake pedal angle changed with the brake pedal operation to output a signal corresponding thereto to the transmission control unit 50.

The transmission control unit 50 detects the brake pedal's angle change per hour output from the brake operation sensor 30 to compare the angle change with a change value B1 predetermined for determining the abrupt brake state (S140).

If the angle change per hour is the same as the predetermined change value B1 or larger than that value, it is determined as an abrupt brake state in which the driver applies excessive pressure to the brake.

In the abrupt brake operation, the transmission control unit 50 detects the current vehicle speed in accordance with the signal output form the first pulse generator 10 and the second pulse generator 20 to determine the running shift stage corresponding thereto.

The first pulse generator which is equipped on the kick-down drum detects the rotation number of the drum to output a signal N1 corresponding thereto to the transmission control unit 50. On the other hand, the second pulse generator 20 which is equipped on the output gear of the transmission detects the rotation number of the gear to output a signal N2 corresponding thereto to the transmission control unit 50.

The transmission control unit 50 operates the ratio N1/N2 of the signal N1 output from the first pulse generator 10 to the signal N2 output from the second pulse generator 20 to determine the operated value as the current vehicle running speed.

Then, the transmission control unit 50 compares the current vehicle running speed with the predetermined speed (S170), and then if the running speed is over the predetermined speed, detects the shift stage set up by the shift lever(S180).

The transmission control unit 50 detects the current shift stage set up by the driver according to the signal output from the inhibitor switch S 3, and then if the stage is a D stage, determines the current running shift stage as the fourth speed(S200).

The inhibitor switch S3 outputs the electric signal corresponding to the shift stage set up by the operation of the shift lever equipped on the side of the driver seat to the transmission control unit 50.

The transmission control unit 50 detects the shift stage set up by the vehicle running state in a main routine, and then if the current running shift stage is the fourth speed corresponding to the D stage set up by the shift lever, the transmission control unit 50 performs a sub-routine for down-shifting from the fourth speed into the third speed (S210).

When the shift range corresponding to the D stage set up by the shift lever is not the fourth speed, the transmission control unit detects the shift range(S220) and then if that is the third speed, performs a sub-routine for down-shifting from the third speed into the second speed(S230).

When the shift range is not the third speed, the transmission control unit detects the shift range(S240) and then if that is the second speed, performs a subroutine for down-shifting from the second speed into the first speed(S250).

When the shift stage set up by the shift lever is not the D stage, the transmission control unit detects the shift stage (S260) and then if that is the second stage, again detects the current running shift range and then if that is the second speed, performs a sub-routine for down-shifting from the second speed into the first speed(S240–S250).

When the shift stage set up by the shift lever is not the second stage, the transmission control unit 50 detects the shift stage and then if that is the L stage, outputs a torque reduction request signal A to the engine control unit(not shown)(S260–S270).

If the conditions for performing the abrupt brake routine are not satisfied, the main routine is again brought and the routine is finished.

Figure 6:
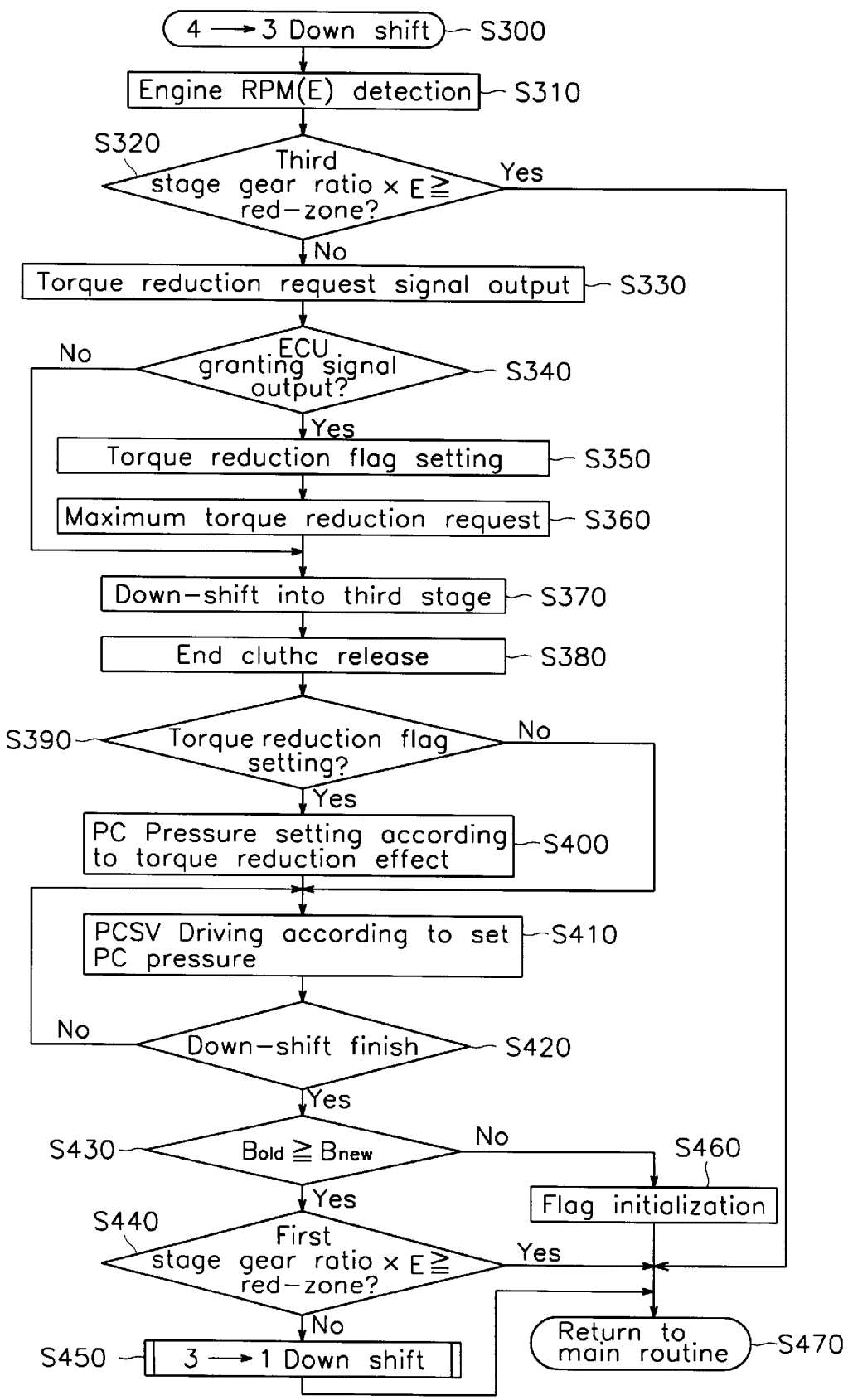
FIG. 6 is a movement sequential view of the down-shift sub-routine from the third stage to fourth stage of the stopping distance reducing control system in panic stop situations according to the present invention.

The sub-routine movements for performing down-shifting from the fourth speed into the third speed, when the shift stage according to the preferred embodiment of the present invention is the D stage and the current running shift range is the fourth speed, is illustrated in FIG. 6.

As shown in FIG. 6, when the routine for performing down-shifting into the third speed begins, the transmission control unit 50 detects an engine RPM.

The transmission control unit detects the engine RPM according to the signal output from the engine RPM sensor (40) which is equipped on the crank shaft of the engine and senses the rotation number of the crank shaft gear rotated with the engine driving(S310).

The transmission control unit detects the multiplied value of the engine RPM by the third speed gear ratio, and then if that is over the red-zone at which the engine overheat is generated, finishes the routine to return the main routine (S320).

The transmission control unit 50 detects the above operated value and if that is below the red-zone, determines that as the state in which the engine overheat is not generated even while down-shifting, and then, as shown in FIG. 1, outputs(S330) a torque reduction request signal A for reducing the engine torque to the engine control unit 70(S330).

Generally, when the torque reduction signal A is output from the shift control 50, the engine control unit 70 may and may not receive the signal in accordance with the current vehicle state.

However, in the preferred embodiment of the present invention, when the torque reduction request signal A is output from the transmission control unit 50, the engine control unit 70 unconditionally receives the signal to prevent the engine overheat while down-shifting.

For the above object, the present invention may give a routine in which when the torque reduction request signal A outputs to the engine control unit 70 itself, the ignition time is unconditionally delayed in accordance with the request, or provide a communication line used only in the above case.

The transmission control unit 50 outputs the torque reduction request signal A to the engine control unit 70, and then detects the outputting state of a reduction admitting signal B(S340). Then, if the engine control unit 70 admits the torque reduction, the transmission control unit sets the torque reduction flag to output a maximum torque reduction request signal C to the engine control unit 70(S350).

According to the maximum torque reduction request signal C of the transmission control unit 50, the engine control unit 70 utmostly delays the ignition time in the D stage so as to reduce the torque in accordance with the engine output.

The transmission control unit 50 delays the ignition time to output the maximum engine torque reduction signal C, and then performs shifting into the third speed by changing the on/off state of a shift solenoid valve 61 in an hydraulic pressure control valve 60.

The transmission control unit 50 performs down-shifting into the third speed by driving the shift solenoid valve and releases an end clutch which has been coupled to the control for shifting into the fourth speed(S380).

Generally, the end clutch is coupled to the transmission control unit for shifting into the fourth speed, but in the preferred embodiment of the present invention, since the fourth speed shifting is not occurred, the hydraulic pressure is not applied to the end clutch.

The end clutch release in the third speed is not affected to keeping the third speed and gives a help to shifting into the second speed after having down-shifted into the third speed.

Figure 4:
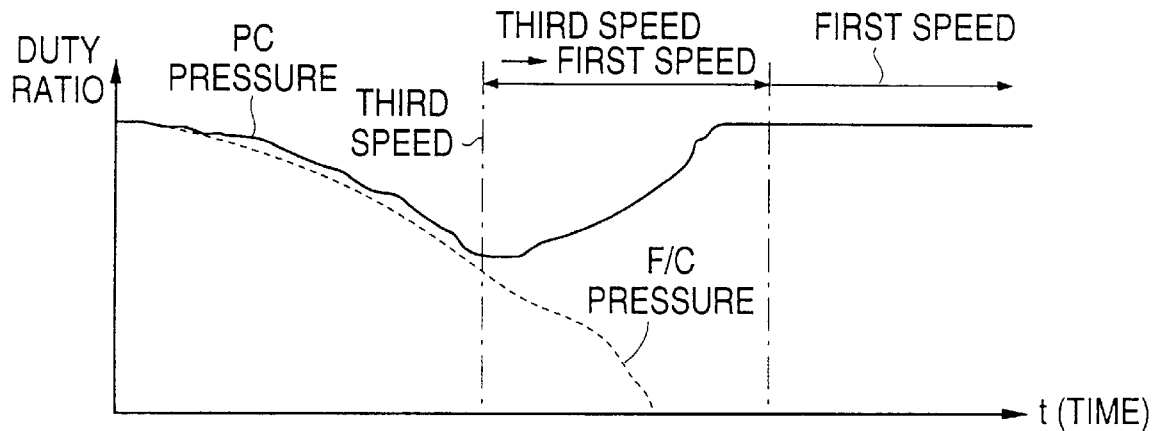
FIG. 4 is a graphical illustration for showing a variation of duty ratio of the hydraulic pressure of the transmission according to the present invention.

To perform down-shifting into the third speed, the transmission control unit 50 forms an hydraulic pressure course by driving the shift solenoid valve 61 and detects the torque reduction flag setting. When the flag setting has been already done, the transmission control unit takes into consideration for the torque reduction effect and sets the duty ratio of the pressure control solenoid valve 63 for controlling the hydraulic pressure applied to each device by the pressure duty ratio line, as shown in FIG. 4, according to the preferred embodiment of the present invention(S400).

The transmission control unit 50 sets duty ratio of the pressure control solenoid valve 63 considering the torque reduction effect and pursuant to the duty ratio drives the pressure control solenoid valve 63, and then detects the down-shift finished state(S410–S420).

When with abrupt braking operation, the vehicle is in a power-off state, the engine is rotated by the counter driving power and the engine RPM becomes lower because the wheels continue rotating without fixing or locking by the ABS.

Since in accordance with proceeding to the lower stage, the corresponding gear teeth numbers are increased, the increase of the gear teeth numbers while down-shifting into the lower stage than the current shift stage enhances the engine RPM. Therefore, the stopping distance is reduced by distributing the vehicle stopping loads only applied to the wheels also to the engine.

When the down-shift from the fourth speed to the third speed is completed, the transmission control unit again detects the operating state of the brake pedal to determine whether the driver has yet pedalled the brake.

The transmission control unit 50 detects the angle change per hour of the brake pedal according to the signal output from the brake operation sensor 30. When the current angle change(B new) is lower than the previous angle change(B old), the transmission control unit determines that state as the one in which the driver has pedalled the brake and decides whether to again perform down-shifting from the current down-shifted third speed to the first speed or the second speed.

The transmission control unit 50 again detects the engine RPM so as to determine whether the multiplied value of the current engine RPM by the first speed gear ratio corresponds to the red-zone(S440). In this situation, when the value corresponds to the red-zone, the transmission control unit returns to the main routine, while when the value does not correspond to the red-zone, the transmission control unit performs the down-shift routine from the third speed into the first speed.

The transmission control unit 50 detects the angle change per hour of the brake pedal in accordance with the signal output from the brake operation sensor 30. When the current angle change(B new) is over the previous angle change(B old), the transmission control unit determines that state as the one in which the driver has pedalled the brake, and then initializes all use flags and returns to the main routine.

Figure 7:
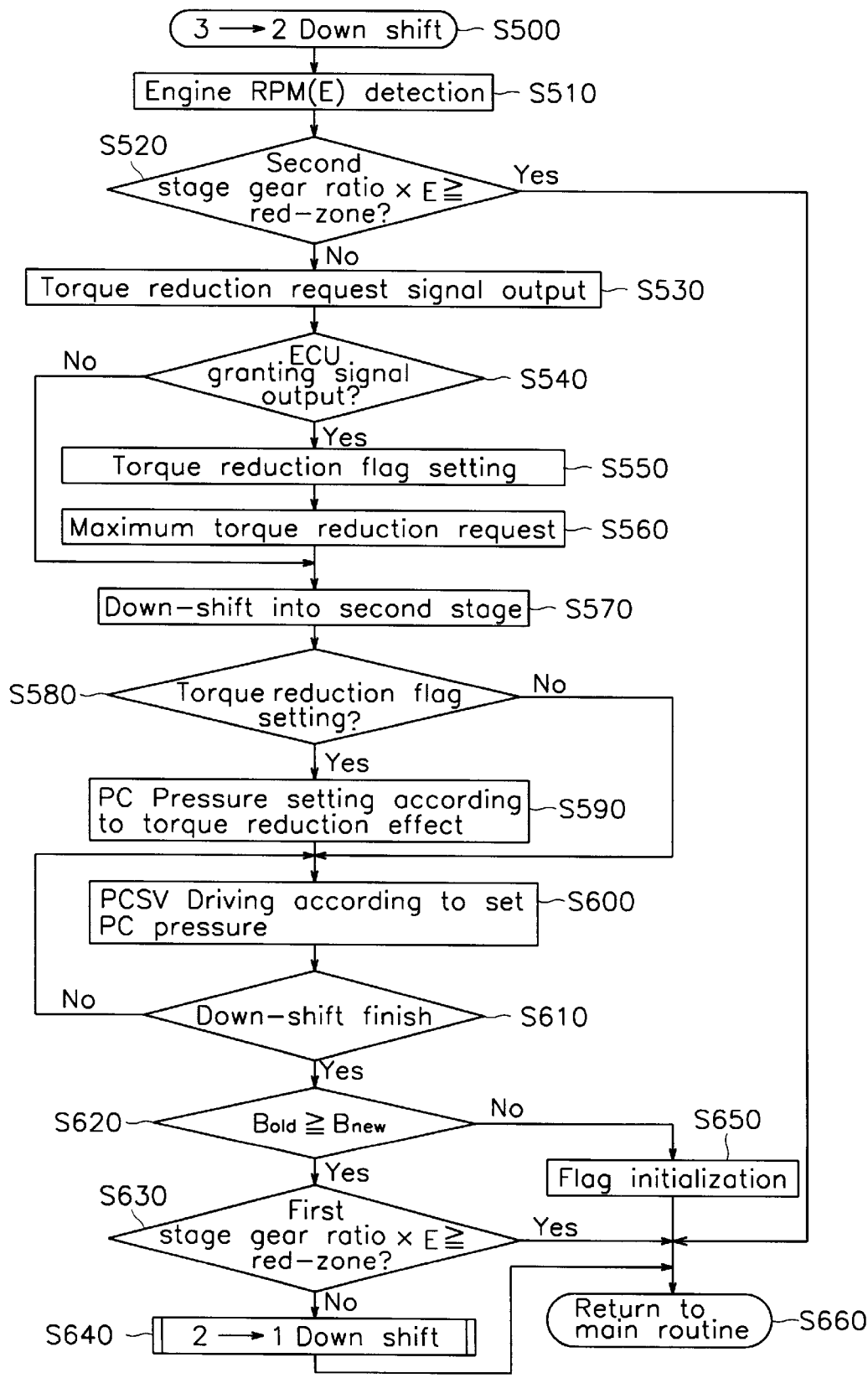
FIG. 7 is a movement sequential view of the down-shift sub-routine from the third stage into the second stage of the stopping distance reducing control system according to the present invention.
Figure 8:
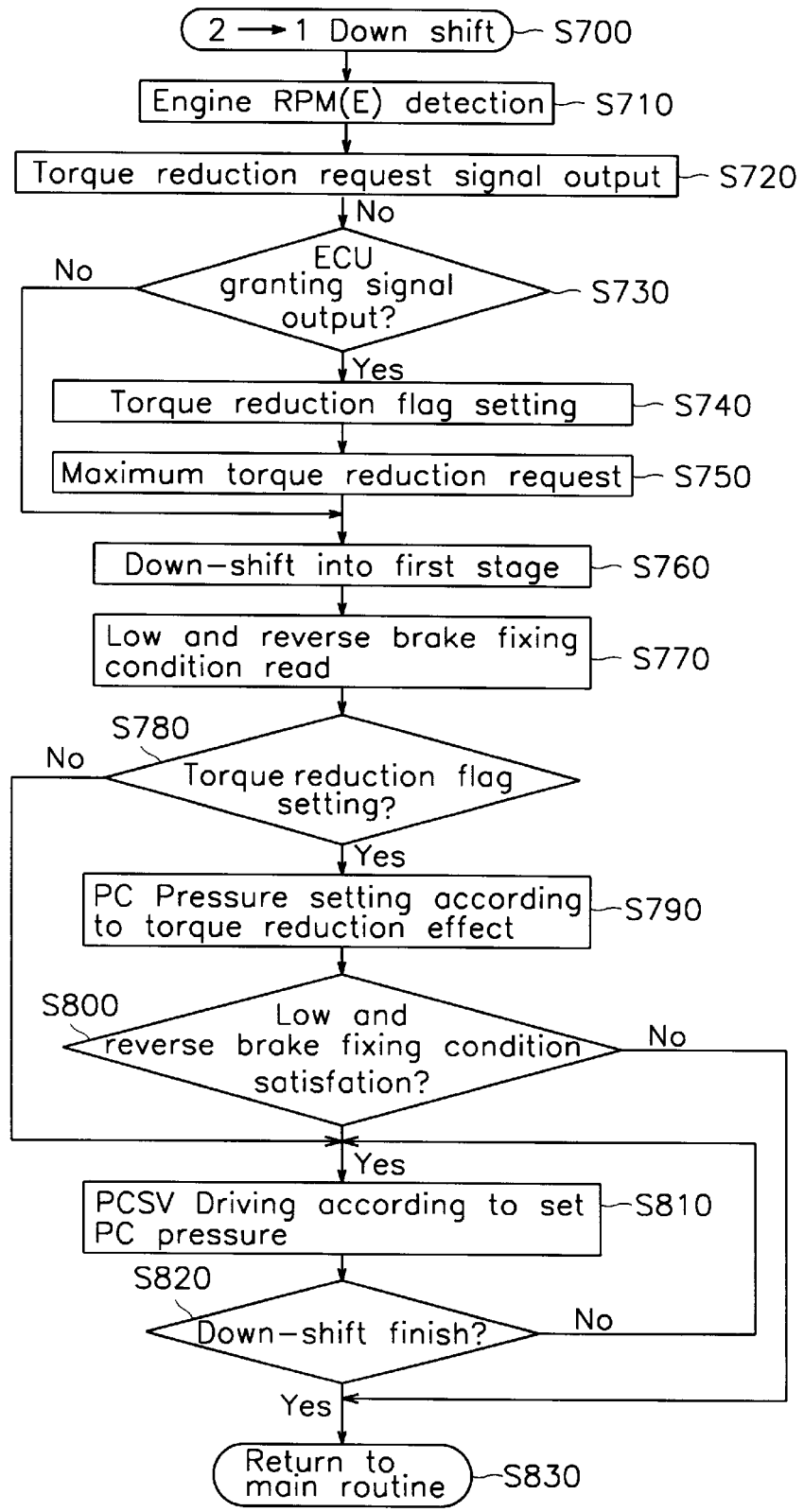
FIG. 8 is a movement sequential view of the down-shift sub-routine from the second stage into the first stage of the stopping distance reducing control system according to the present invention.

When the current running shift stage is the third speed, the transmission control unit performs down-shifting into the second speed in accordance with the routine illustrated in FIG. 7. As shown in FIG. 7, the down-shift movement is performed in the same way as the down-shifting routine from the fourth speed to the third speed.

In the above routine, when the driver continues pedalling the brake even after the down shift into the second speed has already performed, the transmission control unit again decides whether the multiplied value of the current engine RPM by the first speed gear ratio corresponds to the red-zone, and then if the engine overheat is not occurred, performs down-shifting from the second speed into the first speed.

Figure 9:
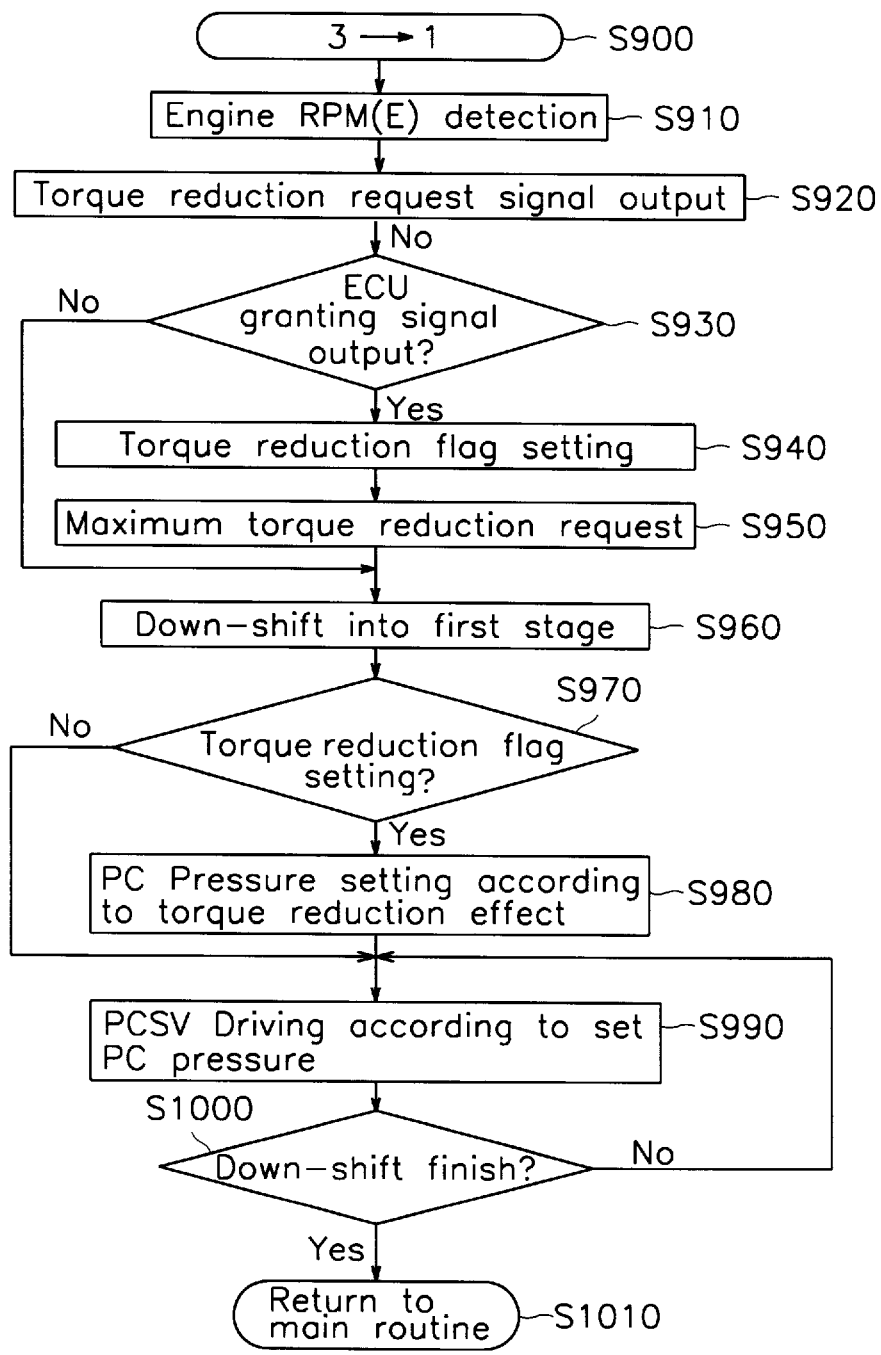
FIG. 9 is a movement sequential view of the down-shift sub-routine from the third stage into the first stage of the stopping distance reducing control system according to the present invention.
Figure 10:
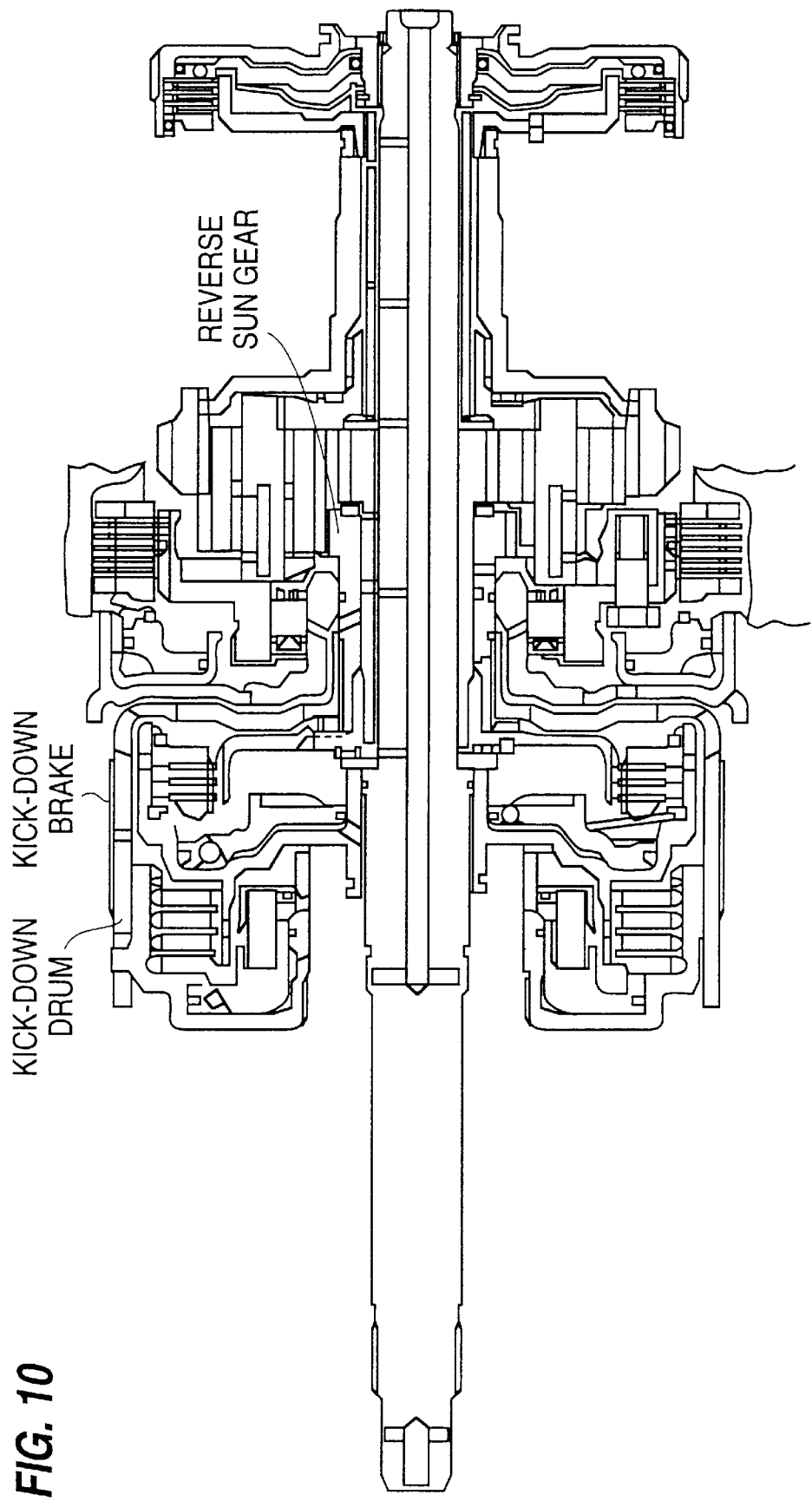
FIGS. 10 and 11 show a conventional transmission with the end clutch and the kickdown drum.
Figure 11:
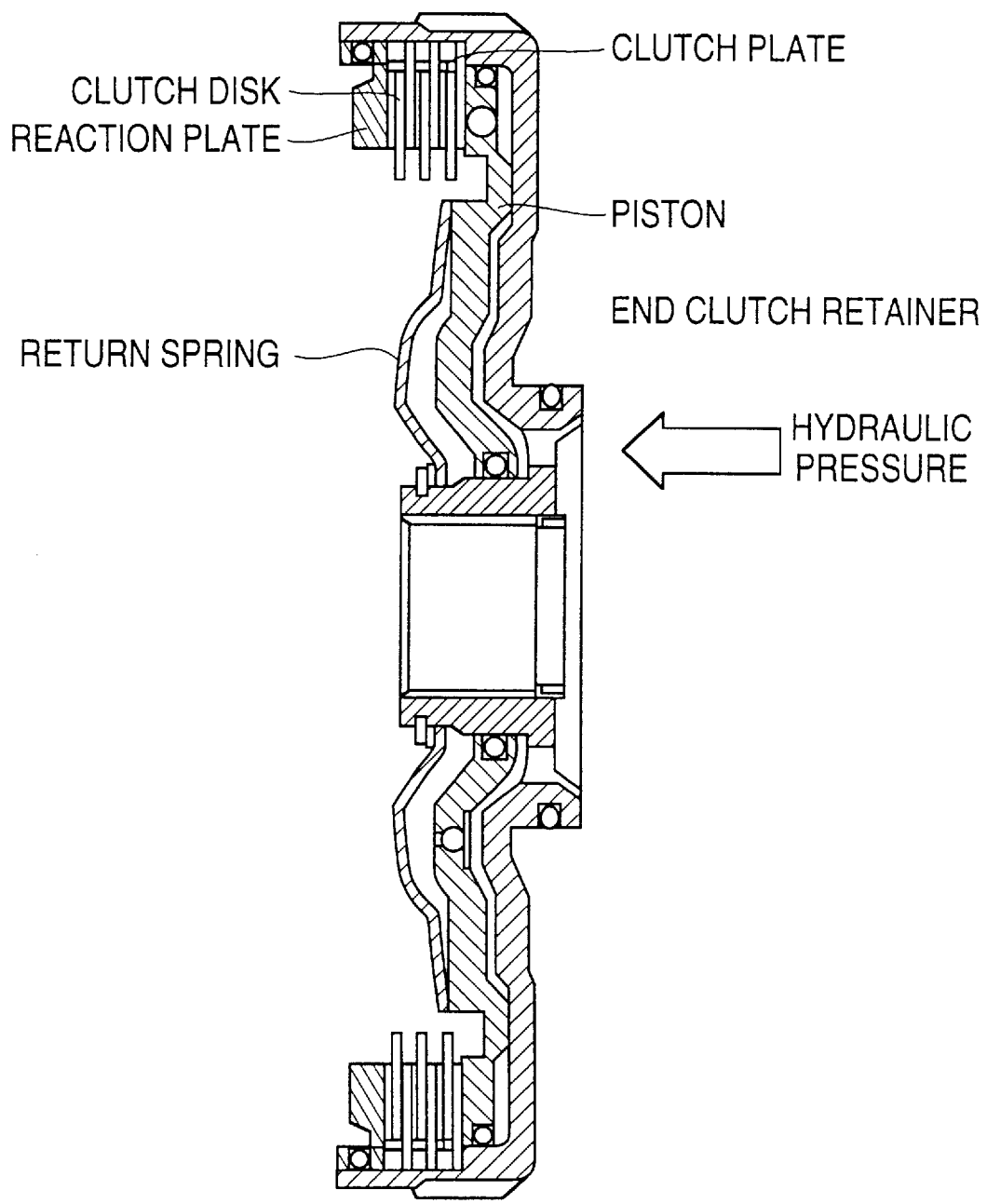

When the current running stage is the second speed, the down-shift into the first speed is performed in accordance with the routine illustrated in FIG. 9.

When down-shifting from the second speed into the first speed according to the preferred embodiment of the present invention, the transmission control 50 performs down-shifting from the fourth speed to the third speed. Likewise, the engine control unit 70 requests the torque reduction and forms the hydraulic pressure course by driving the shift solenoid valve 61 into the state corresponding to the first speed, and then determines the condition for driving the low and reverse brake(S700–S770).

Generally, when in the current fourth speed automatic transmission, the driver puts the shift lever on the L stage, the transmission control unit 50 controls the duty ratio of the pressure control solenoid valve 63 in order to apply the hydraulic pressure to the passage penetrated into the low and reverse brake. That is, in the current automatic transmission, the hydraulic pressure is never applied toward the low and reverse brake until the driver put the shift lever on the L stage.

In the fourth speed automatic transmission, when the shift stage is not the L stage, the engine brake effect in the first speed is not worked because only the one-way clutch, not the low and reverse brake, is operated so that the counter driving force can not be absorbed into the automatic transmission itself.

Therefore, the transmission control unit 50 detects the conditions for driving the low and reverse brake, and then delays the ignition time of the engine by requesting the engine control unit 70 to effect the maximum torque reduction. The transmission control unit further detects the current shift stage to determine the satisfaction of the conditions for driving the low and reverse brake(S780–S800).

When in the abrupt braking operation, the current shift lever is not placed on the L stage and the current shift stage is the first speed, the transmission control unit 50 controls the duty ratio of the pressure control solenoid valve 63 and applies the hydraulic pressure to the low and reverse brake, and thereby transmits the counter driving force of the wheels to the engine in order to generate the engine brake effect (S810).

The transmission control unit detects(S820) down-shifting into the first speed, and then if the down-shift is completed, returns to the main routine(S820).

After down-shifted from the fourth speed into the third speed, the down-shift from the third speed into the first speed can be performed in accordance with the down-shift movements routine illustrated in FIG. 9.

As shown in FIG. 9, the down-shift movement from the third speed into the first speed is performed in the same way as the down-shift routine from the fourth speed into the third speed. The transmission control unit 50 requests the engine control unit 53 to effect the maximum torque reduction and forms the passage by driving the shift solenoid valve to shift into the first stage, and then sets the PC pressure in accordance with the pressure duty ratio line illustrated in FIG. 5, taking into consideration for the torque reduction effect (S900–S950).

Figure 3:
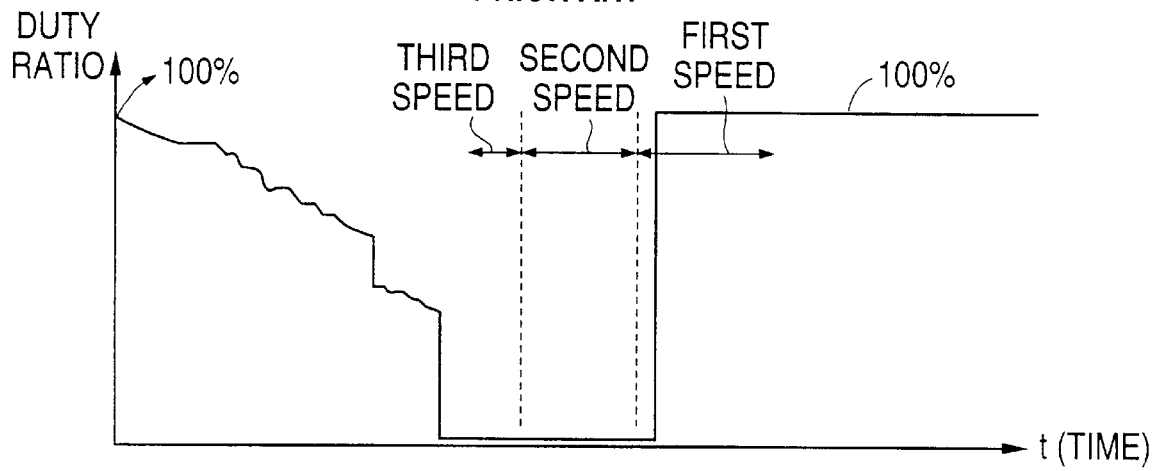
FIG. 3 is a graphical illustration for showing a variation of duty ratio of the hydraulic pressure of the conventional automatic transmission.

In the conventional way, as shown in FIG. 3, when down-shifting from the third speed into the first speed, the transmission control unit controls the PC pressure corresponding to the third speed and keeps the second speed during a certain time, and then controls the PC pressure into the first speed.

However, since in the preferred embodiment of the present invention, it is an object to down-shift within a short time in abrupt braking operation, the shift quality which is critically considered in the automatic transmission would be ignored.

Therefore, as shown in FIG. 4, the transmission control unit controls the duty ratio so as to correspond to the vehicle speed. That is, for reducing the time being of the central state, the transmission control unit computes each clutch's torque grant to determine the adequate duty shift time corresponding thereto.

As shown in FIG. 4, the transmission control unit justly controls the pressure control solenoid valve 63 in accordance with the duty ratio corresponding to the first speed without establishing the keeping time from the third speed to the second speed. The F/C pressure illustrated in FIG. 5 indicates the hydraulic pressure applied to the front clutch.

As described above, the transmission control unit controls the solenoid valve 63 taking into consideration for the torque reduction effect and detects the down shift state into the first speed, and then if the down-shift is completed, returns to the main routine(S960–S1000).

As described above, the pressure controlling solenoid valve 63 is driven with regard to the effect corresponding to the torque reduction, and then the end state of down-shifting to the 'first' speed is decided and the main routine is returned if the down-shift is completed(S960–S1000).

As described above, in the automatic transmission vehicle having the ABS according to the preferred embodiment of the present invention, the control system for reducing the stopping distance in the abrupt braking operation and the method thereof in which when the driver abruptly brakes, the transmission of the vehicle is forcefully down-shifted into a lower stage than the current running shift stage to maximize the engine brake effect, and thereby reduces the stopping distance so that the vehicle safety can be improved, is provided.

What is claimed is:

1. A control system for reducing stopping distance in an abrupt braking operation, comprising:

an idle sensor for detecting an operating state of an accelerator pedal to output an electric signal corresponding thereto;

a brake sensor for detecting an operating state of a brake pedal to output an electric signal corresponding thereto;

a brake operation sensor for detecting an angle change of a brake pedal to output an electric signal corresponding thereto;

an engine RPM sensor for detecting a rotation number of a crank gear to output an electric signal corresponding thereto, the engine RPM sensor being provided on an engine crank shaft and rotated by a driving engine;

a first pulse generator for detecting a rotation number of a kick-down drum to output a signal corresponding thereto, the first pulse generator being provided on the kick-down drum;

a second pulse generator for detecting a rotating number of a gear to output a signal corresponding thereto, the second pulse generator being provided on the output gear of a transmission;

a shaft stage sensor for outputting a signal corresponding to a shift stage set up by the operation of a shift lever;

a transmission control unit which, when the driver depresses the brake pedal, detects an angle change per hour of the brake pedals and if the brake angle change is over a predetermined one, determines that an abrupt braking state exists, and further detects a shift range set up by the operation of the shift lever as well as the current shift stage in accordance with the current shift range, and thus down-shifts into a lower shift stage than the current running shift stage; and a hydraulic pressure control valve for applying a hydraulic pressure to shift gear devices corresponding to shift signal output from the transmission control unit;

wherein when the current shift state corresponds to a third speed, the transmission control unit performs forceful down-shifting into a second speed, and when the down-shifted shift stage corresponds to the second speed, performs forceful down-shifting into a first speed; and wherein when the shift stage corresponds to a fourth speed, the transmission control unit forcefully releases an end clutch while down-shifting into the third speed.

2. The control system of claim 1, wherein when the down-shifted shift stage corresponds to the first speed, the transmission control unit drives a low and reverse brake and thereby obtains an engine brake effect by a counter driving force of wheels.

3. The control system of claim 1, wherein when the down-shifted shift stage corresponds to an L stage as well as the first speed, the transmission control unit outputs a torque reduction request signal to delay an ignition time.

4. The control system of claim 1, wherein only when a multiplied value of the current engine RPM by a gear ratio of the shift stage which should be down-shifted is below a predetermined value corresponding to engine overheat, the transmission control unit performs down-shifting into a corresponding shift stage.

5. The control system of claim 1, wherein the transmission control unit controls the hydraulic pressure in accordance with a duty ratio corresponding to the first speed while down-shifting, and if the down-shift into the first speed is completed, returns to a main routine.

6. The control system of claim 1, wherein when the shift stage corresponds to the second speed, the transmission control unit drives a low and reverse brake while down-shifting into the first speed and effect an engine braking by a counter driving force, and if the down-shift into the first speed is completed, returns to a main routine.

7. The control system of the any one of claims 5 to 6, wherein when it is possible to down-shift into a lower stage than the current shift stage, the transmission control unit outputs a torque reduction request signal to delay an ignition time in accordance with the current vehicle state, and if a reduction granting signal which grants the torque reduction request signal is input, performs down-shifting into a lower stage.

8. The control system of claim 7, wherein when the torque reduction request signal for delaying the ignition time is output from the transmission control unit, the engine control unit grants the torque reduction request signal to delay the ignition time, and then outputs the reduction granting signal corresponding thereto.

9. A method for reducing stopping distance of a vehicle in an abrupt braking operation, the method comprising:

detecting an idle sensor and a brake sensor while initializing all use variables when a power source is applied to the vehicle;

detecting an angle change per hour of a brake pedal when the idle sensor and the brake sensor are operated;

determining that an abrupt braking state exists when the angle change per hour of the brake pedal is over a predetermined value;

detecting a shift range set up by a current shin lever as well as a current running shift stage according to the shift range when abruptly braking; and down-shifting into a lower stage than the current running shift stage;

wherein when the current shift stage corresponds to a third speed the transmission control unit performs forceful down-shifting into second speed, and when the down-shifted shift stage corresponds to the second stage, performs forceful down-shifting into first speed; and wherein when the shift stage corresponds to the fourth speed, the transmission control unit forcefully releases an end clutch while down-shifting into the third speed.

10. The method of claim 9, wherein when the down-shifted shift stage corresponds to the first speed, the transmission control unit drives a low and reverse brake and thereby effects an engine brake by a counter driving force of wheels.

11. The method of claim 9, wherein the down-shifted shift stage corresponds to a L stage as well as the first speed, the transmission control unit outputs a torque reduction request signal to delay an ignition time.

12. The method of claim 9, wherein only when a multiplied value of a current engine RPM by a gear ratio of the shift stage which should be down-shifted is below a predetermined value corresponding to engine overheat, the transmission control unit performs down-shifting into a corresponding shift stage.

13. The method of claim 9, wherein the transmission control unit controls the hydraulic pressure in accordance with a duty ratio corresponding to the first speed while down-shifting, and if the down-shift into the first speed is completed, returns to a main routine.

14. A The method of claim 9, wherein when the shift stage corresponds to the second speed, the transmission control unit drives a low and reverse brake while down-shifting into the first speed and effects engine braking by a counter driving force, and if the down-shift into the first speed is completed, returns to a main routine.

15. The method of any one of claims 12 to 14, wherein when it is possible to down-shift into a lower stage than the current shift stage, the transmission control unit outputs a torque reduction request signal to delay an ignition time in accordance with the current vehicle state to an engine control unit, and if a reduction granting signal which grants the torque reduction request signal is outputted from the engine control unit, performs down-shifting into a lower stage together with requesting the engine control unit to effect torque reduction.

* * * * *

UNITED STATES PATENT AND TRADEMARK OFFICE
CERTIFICATE OF CORRECTION

PATENT NO. : 5,803,864
DATED : September 8, 1998
INVENTOR(S) : Jin-ho Yoo

It is certified that error appears in the above-identified patent and that said Letters Patent is hereby corrected as shown below:

Claim 7, Col. 10, Line 15, "claims 5 to 6" should read —claims 4 to 6—.

Claim 9, Col. 10, line 39, "shin" should read --shift--.

Signed and Sealed this

Fifteenth Day of December, 1998

Attest:

BRUCE LEHMAN

*Attesting Officer*　　*Commissioner of Patents and Trademarks*